United States Patent

[11] 3,622,420

[72] Inventor Austin A. Knox
White Plains, N.Y.

[21] Appl. No. 725,835
[22] Filed May 1, 1968
[45] Patented Nov. 23, 1971
[73] Assignee Dict-O-Tape Inc.
Brooklyn, N.Y.

[54] METHOD OF MAKING A MAGNETIC RECORDING TAPE WITH LAMINATED LEADER
7 Claims, 4 Drawing Figs.

[52] U.S. Cl. .......... 156/271, 156/269, 156/297, 156/302, 274/43
[51] Int. Cl. .......... B32b 31/00
[50] Field of Search .......... 156/157, 193, 311, 302, 271, 73; 352/235, 237; 274/43

[56] References Cited

UNITED STATES PATENTS

| | | | |
|---|---|---|---|
| 2,900,868 | 8/1959 | Gaffney | 156/157 X |
| 3,022,165 | 2/1962 | Solow et al. | 352/235 X |
| 3,269,278 | 8/1966 | Olstad | 156/271 X |
| 3,293,099 | 12/1966 | Stark | 156/311 X |
| 3,418,185 | 12/1968 | Balamuth et al. | 156/73 |

*Primary Examiner*—Benjamin R. Padgett
*Assistant Examiner*—R. L. Tate
*Attorney*—Howard C. Miskin

ABSTRACT: A method for producing an improved magnetic recording tape (17, FIG. 1) comprising bonding the entire length of a reinforcing tape 22 to a portion of magnetic tape which is to serve as an end portion of the finished tape to thereby provide a reinforced laminated leader.

INVENTOR.
AUSTIN A. KNOX
BY Curtis Ailes
ATTORNEY

METHOD OF MAKING A MAGNETIC RECORDING TAPE WITH LAMINATED LEADER

This invention relates to a method for producing magnetic recording tapes, and particularly for producing improved tapes having an improved laminated leader element of high strength at the tape end.

Magnetic tape recording machines and tape players generally employ a flexible plastic tape having a magnetic coating thereon. This tape is generally rather thin and fragile. The thinness of the tape permits the storage of a long recording on a small tape reel. However, it is generally necessary to provide for a higher strength tape at the tape ends. This accommodates for the greater tape stresses involved with attaching the tape end to a takeup reel, and in stopping and starting the tape at the end of the reel. The higher strength tape end is generally referred to as a "leader." The usual method for providing a leader is by attaching a high-strength tape at the end of the magnetic tape by means of a hand splicing machine. The leader simply consists of a section of heavier tape which is spliced on the end of the magnetic tape by means of an adhesive or by means of a splicing patch of pressure sensitive adhesive material. This splicing operation for the attachment of the leader tape is necessarily time consuming and expensive. Heretofore it has been thought to be necessary and unavoidable. This hand splicing operation is particularly difficult and intricate in the production of the narrower recording tapes which now conventionally may be only 0.150 inch in width.

Accordingly, it is one object of the present invention to provide an improved method for producing magnetic recording tapes in which the production time and cost are greatly reduced, particularly in the operation of attaching the leader to the end of the tape.

Another object of the invention is to provide an improved method for attachment of the leader to a magnetic recording tape which reduces the intricacy of the operation so as to require less skill on the part of the operator, and thus reducing the cost of the operation.

Another problem in connection with magnetic recording tape structures having leaders provided thereon is that the weakest point in the entire structure is often the splice between the leader and the remainder of the tape. If this splice breaks, the tape becomes inoperative unless it can be repaired. Such a repair may be very difficult, particularly in a tape cartridge of the completely self-contained type having both reels and both tape ends normally completely enclosed within the cartridge.

Accordingly, it is another important object of the present invention to provide an improved method for producing magnetic recording tapes which greatly reduces the susceptibility to breakage of the tape at a joint between the leader and the remainder of the tape.

Other objects and advantages of the invention will be apparent from the following description and the accompanying drawings.

In carrying out the present invention, there is provided a method for producing an improved magnetic recording tape including bonding the entire length of a reinforcing tape to a portion of magnetic tape which is to serve as an end portion of the finished tape to thereby provide a reinforced laminated leader.

Figures 3, 4:
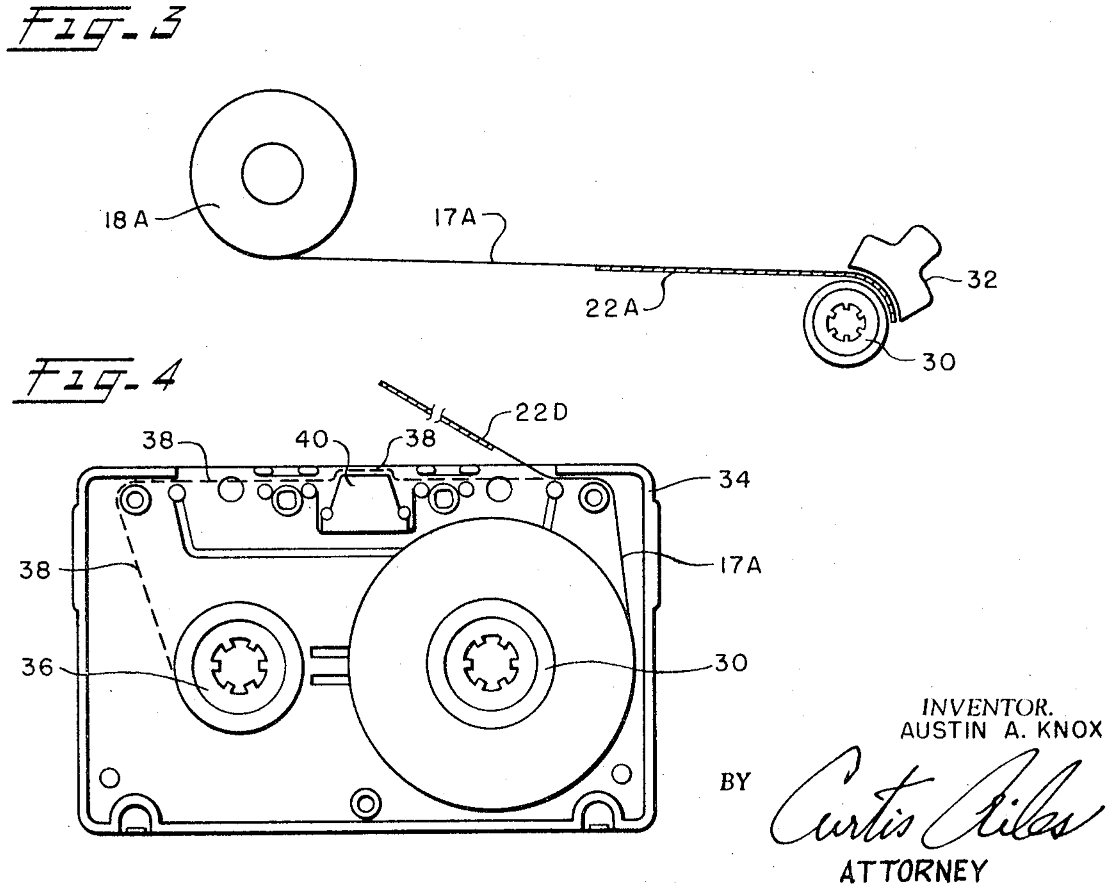
FIG. 3 illustrates a different step of attaching a hub, which is followed in a form of the method of the present invention.

And FIG. 4 illustrates another step, of winding and cutting off an individual finished tape, which is followed in a form of the method of the present invention.

Figure 1:
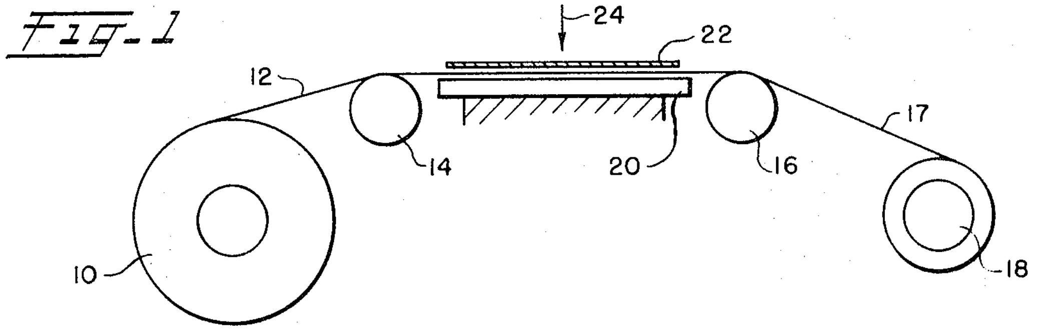
FIG. 1 illustrates an essential step, the application of a reinforcement tape, in the practice of the method of the present invention.

Referring particularly to FIG. 1, there is illustrated a roll of magnetic tape 10 which has had the magnetic material applied thereto and which is essentially complete as a magnetic tape structure except for the provision of a leader. The end 12 of this magnetic tape is threaded over guide rollers 14 and 16 to a takeup roll 18. Between guide rollers 14 and 16 the tape is threaded across a work table 20 having a flat work surface. Whenever a portion of the tape 12 which is to become the end portion of a finished tape is positioned across the table 20, a piece of reinforcing tape 22 is cemented along its entire length to the magnetic tape 12.

The roll 10 is preferably considerably longer than the individual length of tapes to be used on an individual reel in the tape recorder or player machine. Accordingly, in a typical procedure in accordance with the present invention, a reinforcement tape 22 is attached at the lead end of the tape 12, and then additional reinforcing tapes 22 are attached at intervals as the tape is wound from the roll 10 to the takeup roll 18. These intervals correspond to the lengths of the finished individual tapes which it is desired to produce. A typical length, for instance, may be 300 feet. When the tape, rewound on roll 18, is to be divided into individual finished tapes, these individual tapes are separated from the long tape roll by unwinding and cutting at a point indicated at 24 at the longitudinal center of the reinforcing tape 22. This provides a reinforced laminated leader end for each of the severed tapes. Since the reinforcing tape 22 is bonded for its entire length to the associated portion of the magnetic tape, the attachment of the reinforcement is very secure. Furthermore, since the magnetic tape itself forms a part of the resulting reinforced "leader" section, any added stresses which are applied to the leader are transmitted to the magnetic tape as well as to the reinforcement 22 making separation of the laminated parts of the leader extremely improbable.

While it is suggested above that the reinforcements 22 are applied and the entire roll 10 of tape is next wound upon the takeup roll 18, the individual lengths of tape may be cut at 24 immediately as the patches 22 are applied, and the ultimate recorder windup reel may be placed in the position of takeup roll 18. A new reel is then inserted and the next tape section is wound upon it.

Figure 2:
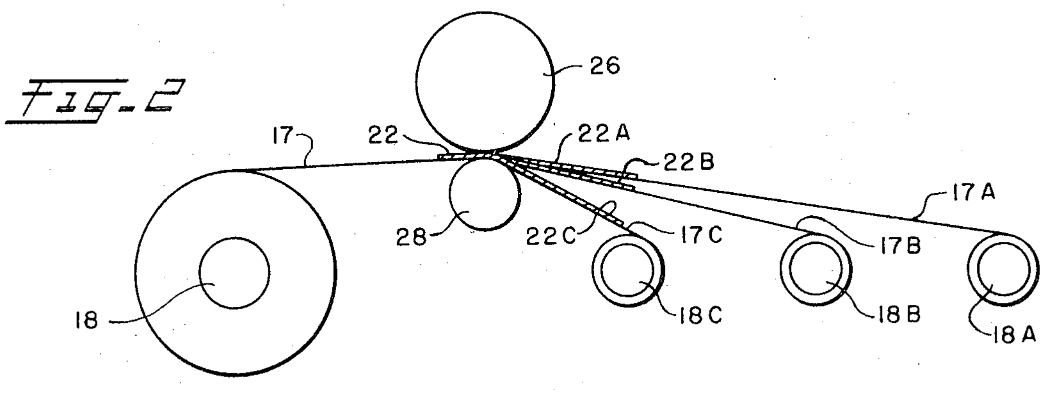
FIG. 2 illustrates a second step of slitting the tape which is followed in a form of the method of the present invention.

FIG. 2 illustrates another step which is followed in accordance with a form of the method of the present invention. In the above description of the method step illustrated in FIG. 1, there is no discussion of the problem of producing the finished lengths of magnetic tape in exactly the proper widths. The roll of tape 10 may be "preslit" to exactly the proper width before the reinforcement tape 22 is laminated to it. However, in accordance with a preferred form of the method of the present invention, the roll 10 of FIG. 1 is a raw jumbo roll of tape, which may be from 6 to 12 inches or more in width. Thus, the reinforcement tape 22 is also the full 6 to 12-inch width. The tape, with the laminated reinforcement tapes, on the takeup roll 18 is then slit into the desired tape widths after the reinforcements 22 have been applied. This is the operation illustrated in FIG. 2. The widths to which the finished tape is slit may be, for instance, the conventional ¼-inch width, or even the narrower width of 0.150 inch. By slitting the tape after the application of the reinforcing tape 22, leaders are immediately provided upon all of the finished width tapes which are divided by the slitting operation from the large wide roll. Thus, starting with a 12 inch wide roll of magnetic tape, in the order of 65 or 75 long tapes of finished width, complete with leaders, may be produced from the application of a single set of reinforcement tapes 22.

Referring more particularly to FIG. 2, the takeup roll 18, with the reinforcements 22 applied, is threaded at 17 between slitting cutters 26 and a backup roll 28. The slit tapes 17A, 17B, 17C, including the slit portions of the leader reinforcement 22 at 22A, 22B, and 22C are wound respectively upon the takeup reels 18A, 18B, and 18C. It will be understood that FIG. 2 illustrates this method only schematically. In particular, only three takeup reels are illustrated. However, as indicated just above, as many as 65 or 75 takeup reels may be necessary to accommodate the entire output from the slitting cutters 26.

Where the method step of FIG. 2 is employed, the method step illustrated in FIG. 1 may be combined with it. That is, the leader reinforcement tapes 22 may be applied to the wide tape (at 17 in FIG. 2) just before the tape enters the nip of the slitter 26. The adhesive which is employed for the reinforcement tape 22 is tacky enough so that there is no necessity for a delay after it is applied before the slitting operation can be undertaken. This procedure has the advantage of reducing the number of times that the tape must be separately handled and rewound.

FIG. 3 illustrates still another method step which is to be followed in a form of the method in accordance with the present invention. In accordance with this method step, the tape 17A from the takeup reel 18A of FIG. 2, or from takeup reel 18 of FIG. 1, has its laminated leader end permanently attached to a takeup reel hub 30. This attachment is preferably carried out by a fusion bonding of the tape leader to the cylindrical exterior surface of the hub 30. The preferred method for producing this fusion bond is by so-called ultrasonic welding. The side of the leader having the reinforcement tape 22A is preferably in contact with, and attached to, the hub 30. The reinforcement tape 22A and the hub 30 are preferably composed of the same organic resin material to promote the formation of a good fusion bond. An ideal material for this purpose is polypropylene.

An ultrasonic welding tool for accomplishing the weld is schematically illustrated at 32. This mode of attachment of the leader to the takeup reel 30 is extremely fast and efficient. The actual ultrasonic welding time for the attachment is only about 0.6 seconds. Since the leader is attached to a substantial circumferential arc of the hub 30, which may be in the order of 30°,the attachment is quite strong and will withstand the rapid stops of the end of the tape reel travel without pulling loose from the hub 30. This method of attachment of the leader to the hub 20 replaces more complicated conventional methods including hubs having notches and separate spring clips for attachment of the leader.

An alternative method for the attachment of the leader to the hub in accordance with the present invention is as follows: the underside of the leader 22A, as illustrated in FIG. 3, is precoated with a heat-activated adhesive. This is an adhesive material which is not at all tacky or sticky until the material is heated to its activation temperature, which may commonly be in the order of 200° F. The leader is placed with its surface containing the heat-activated adhesive upon the exterior circumferential surface of the hub 30, as illustrated in FIG. 3. A heating mandrel is then applied to the laminated leader tape over the circumference which is to be adhered to the hub 30. For the purpose of illustrating this modification, the tool 32 shown in FIG. 3 may be considered as such a heating mandrel. The mandrel need only be applied for a few seconds, or even for merely a fraction of a second, in order to activate the adhesive and provide the bond. With this method, there is no need to make the hub identical in composition to the leader. It is necessary only that both materials be adherent to the heat-activated adhesive. Thus, a material such as a nylon, which has desirable low-friction properties, may be selected for the hub.

FIG. 4 illustrates still another step which is preferably included in the method of the present invention. In this method step, the individual length of magnetic tape which has been attached to the hub 30 is fully wound upon that hub while the hub is supported in a magnetic tape cartridge casing 34 in which the tape is to be finally used. The end of the tape section 17A is then cut off at the laminated leader indicated at 22D from the long roll 18A. The individual roll of magnetic tape on the takeup hub 30 therefore need never be removed from the cartridge casing 34.

The next step in the completion of the assembly, not illustrated in FIG. 4, is the attachment of the loose tape leader end at 22D to another tape hub 36 which is substantially identical to hub 30. This attachment is again carried out by means of the ultrasonic welding operation described in connection with FIG. 3. The tape is then threaded through the cartridge in the path indicated by dotted lines 38 over the appropriate guides and over the pressure pad shown at 40. The hub 36 is installed in the cartridge as shown in FIG. 4. A cartridge cover (not shown) is then fastened over the casing 34, and the cartridge is then complete and ready to receive recorded information.

The cartridge casing 34 and the associated structure illustrated in FIG. 4 is of a type which is presently referred to as a "cassette." This is a completely self contained magnetic tape cartridge which is inserted into a tape recorder or tape player with the magnetic transducer biased against the tape at the face of the pressure pad 40, depressing the pressure pad 40. The particular structure and arrangement of the pressure pad 40 illustrated in FIG. 4 forms a portion of the subject matter described and claimed in a copending patent application (Docket 803) filed concurrently with the present application and assigned to the same assignee as the present application.

Various adhesives may be employed to laminate the leader reinforcement tape 22 to the magnetic tape. The chief requirements are that the adhesive should be reasonably easy to apply, and that it should adhere very tenaciously. It need not remain tacky since it is not intended that the lamination should ever be separated. One class of adhesives which are particularly useful and preferred for this purpose are the acrylics. One example of such an adhesive which is quite satisfactory is a cross-linking acrylic adhesive which is available from the Catalin Division of the Ashland Oil and Refining Company under the product designation Catalin A1085. A white pigment is preferably added to this product in order to provide an optical contrast in the appearance of the laminated leader portion. This is of assistance in distinguishing the leader portion from the remainder of the magnetic tape as the individual tape lengths are separated from the large roll. With the white pigment, it is much easier for a human operator to observe the position of the leader, and it is also possible to employ photoelectric means to detect the exact leader position. When employing the above-mentioned adhesive, the adhesive is applied in the usual way to the reinforcement tape material 22, and heated for one minute at 300 degrees Fahrenheit. This causes the adhesive to become and remain sufficiently tacky when the reinforcement tape 22 is later applied to the magnetic tape to securely adhere to the magnetic tape.

The heat activated adhesive, when used in the alternative method of attachment of the tape to the hub, is applied to the reinforcement tape 22 after the above-mentioned acrylic adhesive is applied and heated to 300° Fahrenheit (and subsequently cooled), as described above.

Immediately after the application and heating of the above mentioned acrylic pressure sensitive adhesive, a protective backing paper may be applied to the pressure sensitive adhesive side of the reinforcement tape 22 in order to provide ease of handling. That paper is then stripped off at the time the reinforcement tape is applied to the magnetic tape in the step described above in conjunction with FIG. 1.

With further reference to FIG. 1, the step of attachment of the reinforcement tape 22 may be alternatively performed as follows: The correct length of reinforcement tape 22 may be measured off from a large supply roll of such tape and caused to adhere to the outer surface of a vacuum roll. The term "-vacuum roll" as used here refers to a roll which may be composed of metal and which may have small perforations in the surface of the roll communicating with a hollow interior to which a vacuum pump is applied. Thus, the tape is caused to adhere to the vacuum roll by reason of the vacuum effect. The tape is measured off onto the vacuum roll and cut to the correct length, and any protective backing on the pressure sensitive adhesive is at the same time removed from the reinforcement tape 22. The reinforcement tape 22 is then applied to the magnetic tape by rolling it onto the magnetic tape by pinching the two tapes between the vacuum roll and another roll such as roll 16 in FIG. 1. In this manner, the reinforcing tape 22 may be laminated to the magnetic tape 17 without stopping the tape 17. Furthermore, accomplishing the lamination between the rolls assures a very smooth and secure lamination without any "bubbles" or unsecured areas.

In the practice of the present invention, the magnetic tape employed may have a body which carries and supports the magnetic coating which is composed of a polyester. Typical thicknesses for this polyester tape are 0.00025, 0.0003, and 0.0005 inch. The leader reinforcement may be composed of various materials, but a preferred material is polypropylene having a thickness of 0.003 inch. A material 0.005 inch in thickness is quite satisfactory, but it has been determined that the additional thickness is unnecessary.

In a typical physical embodiment, the individual tapes which are cut to length and installed within the cassette 34 illustrated in FIG. 4 are 300 feet long. The laminated leader at each end of each tape is 7 inches long.

While this invention has been shown and described in connection with particular examples, various alterations and modifications will occur to those skilled in the art. Accordingly, the following claims are intended to define the valid scope of this invention over the prior art, and to cover all changes and modifications falling within the true spirit and valid scope of this invention.

I claim:

1. A method for producing an individual magnetic recording tape for use in a cassette or cartridge or on a roller, comprising unwinding magnetic tape from a roll of tape longer than the length of individual tapes, bonding a reinforcing tape to the magnetic tape at predetermined spaced to form an assembly intervals, the spaced intervals corresponding to the selected lengths of the individual finished tapes, cutting through said assemblies tape for providing individual finished tapes with end portions having a reinforced laminated leader at each end.

2. A method as in claim 1 wherein said assemblies are cut substantially at the longitudinal center of each reinforcing tape.

3. The method as claimed in claim 1 including the additional step of fusion bonding one of the laminated leaders of an individual finished tape to the outer surface of a support hub.

4. A method as claimed in claim 1 wherein the long magnetic tape is in the form of a roll of tape which is substantially wider than the finished tape width desired, and including the additional step of slitting the long tape into separate long narrow tapes of a desired individual finished width after the step of applying the reinforcing tapes and before the step of cutting the long tape into individual finished tapes, the original reinforcing tape being as wide as the magnetic tape and being slit therewith.

5. A method as claimed in claim 4 wherein the slitting step is performed substantially simultaneously with the reinforcing tape bonding step.

6. A method as claimed in claim 3 wherein the side of the laminated leader end which is fusion bonded to the support hub is the side containing the reinforcing tape.

7. A method as claimed in claim 1 including the additional steps of coating said reinforcing tape with a heat-activated adhesive on the surface opposite to the surface to be bonded to the magnetic tape, said coating step being performed prior to the bonding step, and then adhering the laminated reinforcing tape to the outer surface of a support hub by applying heat to activate said heat-activated adhesive while pressing the heated portion of the laminated reinforcing tape with the heat-activated adhesive against the hub surface to which it is to be adhered.

* * * * *